(12) United States Patent
Fisher et al.

(10) Patent No.: US 7,070,203 B2
(45) Date of Patent: Jul. 4, 2006

(54) AIRBAG DEPLOYMENT RATE SENSOR WITH ELECTROSTATIC DISSIPATIVE GUIDE SLOTS

(75) Inventors: John Fisher, Tampa, FL (US); F. Casey Augustine, Lakeland, FL (US)

(73) Assignee: Key Safety Systems, Inc., Lakeland, FL (US)

( * ) Notice: Subject to any disclaimer, the term of this patent is extended or adjusted under 35 U.S.C. 154(b) by 280 days.

(21) Appl. No.: 10/853,208

(22) Filed: May 26, 2004

(65) Prior Publication Data

US 2005/0263991 A1    Dec. 1, 2005

(51) Int. Cl.
*B60R 21/16* (2006.01)

(52) U.S. Cl. .................... 280/735; 280/743.2; 324/166

(58) Field of Classification Search ................ 280/735, 280/743.2, 728.1, 734; 324/166
See application file for complete search history.

(56) References Cited

U.S. PATENT DOCUMENTS

| | | | |
|---|---|---|---|
| 6,129,379 A | 10/2000 | Specht | |
| 6,186,540 B1 * | 2/2001 | Edgren | 280/735 |
| 6,189,928 B1 * | 2/2001 | Sommer et al. | 280/743.2 |
| 6,308,983 B1 | 10/2001 | Sinnhuber | |
| 6,315,323 B1 * | 11/2001 | Pack, Jr. | 280/743.2 |
| 6,425,603 B1 | 7/2002 | Eschbach | 280/743.2 |
| 6,789,818 B1 | 9/2004 | Gioutsos | |
| 6,789,819 B1 * | 9/2004 | Husby | 280/735 |
| 6,793,243 B1 * | 9/2004 | Husby | 280/735 |
| 6,796,578 B1 * | 9/2004 | White et al. | 280/735 |
| 6,825,654 B1 | 11/2004 | Pettypiece, Jr. | |
| 6,840,539 B1 * | 1/2005 | Pettypiece, Jr. | 280/735 |
| 6,951,532 B1 * | 10/2005 | Ford | 493/407 |
| 2004/0119273 A1 | 6/2004 | Husby et al. | |

* cited by examiner

Primary Examiner—Paul N. Dickson
Assistant Examiner—Tiffany Webb
(74) Attorney, Agent, or Firm—Lonnie Drayer; Patrick Steinnon

(57) ABSTRACT

An airbag deployment rate sensor has a printed circuit board with a substrate that has guide slots for the withdrawal of deployable tapes. Each tape is fastened to the interior of the airbag. When the airbag is deployed, the tapes are withdrawn from tape cartridges mounted with respect to the substrate. The surfaces of the guide slot are coated with an electrically conductive coating. Static charges on the tapes are dissipated as they pass through the guide slots.

9 Claims, 2 Drawing Sheets

AIRBAG DEPLOYMENT RATE SENSOR WITH ELECTROSTATIC DISSIPATIVE GUIDE SLOTS

FIELD OF THE INVENTION

The present invention relates to static electricity dissipation structures and methods that are employed with airbag deployment sensors that utilize a substantially nonconductive tape or string.

BACKGROUND OF THE INVENTION

Although airbags are generally mounted to deploy toward the expected position of a vehicle occupant, at times the vehicle occupant may be out of position, e.g., too close to the airbag, such that activation of the safety system, particularly an airbag may be harmful. However, systems which attempt to predict where the vehicle occupant will be during the time the airbag is deploying are limited by the necessity of predicting the future with all the uncertainty that entails. A recently developed approach is to monitor the deployment of the airbag itself and to open a vent to stop airbag deployment if the airbag prematurely impacts a vehicle occupant. In this way the necessity of predicting the future is avoided and action by the vehicle safety system is taken based on the actual interaction between the vehicle occupant and a deploying airbag. One effective way to obtain this information is to mount one or more tape dispensing cartridges within the airbag with the ends of the tapes fixed to the interior of the airbag as taught, for example in U.S. Pat. No. 6,129,379. As the airbag is deployed, the rate of tape extraction is monitored. A sudden reduction in the tape extraction rate indicates that the airbag has encountered a vehicle occupant. Static charges present on the dispensing tapes, however, can cause an electrostatic discharge to the tape sensors which interferes with the accurate collection of sensor data, or can even damage electronic components.

What is needed is a means for dissipating static charge on the tape that lessens the possibility of electrostatic discharge related interference with the collection of sensor data.

SUMMARY OF THE INVENTION

An airbag deployment rate sensor incorporates a printed circuit board having a substrate with guide slots that extend through the substrate. A deployable tape is withdrawn through each slot. Sensors for monitoring the rate at which tape is withdrawn are mounted about the guide slots on the circuit board. Each tape extends through a slot and extends to, and is fastened to, the interior of an airbag. When the airbag is deployed, the tapes are withdrawn from tape cartridges mounted behind the substrate so the tapes are drawn through the slots in the circuit board. The edges or sides of the slots and a portion of the board around the slots are coated with an electrically conductive coating, e. g. copper, rendering the slots smooth and conductive. Static charges on the tapes are dissipated as they pass through and brush against the sides or edges of the guide slots.

It is a feature of the present invention to provide an airbag deployment rate sensor that suppresses static discharges developed by deployment monitoring tapes.

It is another feature of the present to provide a method of forming smooth sides of a slot through a circuit board.

Further features and advantages of the invention will be apparent from the following detailed description when taken in conjunction with the accompanying drawings.

DETAILED DESCRIPTION OF THE INVENTION

As anyone who lives in a northern climate know, fabrics which are rubbed together or against a non-conducting surface can develop a static charge. A static charge requires a nonconductive substrate from which electrons are removed by engagement with another nonconductive substrate. For examples leather or plastic soles of shoes may pick up a static charge when walking over a carpet. Recently, a new type of airbag has been developed which incorporates active components that measure the rate of airbag deployment and, in the event the airbag stops deploying too soon, indicating the airbag has prematurely impacted a vehicle occupant, a vent is opened, collapsing the airbag or preventing further deployment. A mechanism for monitoring airbag deployment has a plurality of strings or tapes that are sewn on the inside of the airbag. As the airbag inflates, string or tape is drawn from a tape cassette, spool or bobbin, and the rate of tape withdrawal is monitored. The string or tape must be made of lightweight material that is not stiff, so that the string or tape does not pose a hazard by penetrating the airbag itself.

However it has been found that the tape or string can develop a static charge of sufficient magnitude to prevent proper operation of the sensors which monitor the rate at which tape is being withdrawn from the tape cassettes. Airbag deployment is very rapid, requiring only perhaps 10 to 25 milliseconds, which means that the tape leaving the tape dispenser may reach a velocity of over 100 feet per second. These high velocities, combined with the nonconductive nature of the tape 40, which is typically cloth, can produce electrostatic discharge.

The solution developed is to pull the tape or string through a grounded metal slot. The grounded metal slot is formed with little or no additional cost by integrating the grounding function into the circuit board on which the tape deployment monitoring electronics are mounted. The circuit board incorporates a ground. A trace on the circuit board brings the ground over to a slot formed in the board, the edges of the slot are plated using the standard technique for plating holes formed in the circuit board. Because the formation of copper traces around the slots and leading to the board ground and the edge plating, occur as part of the normal processing, the only change required to the circuit board is to design and etch masks which are used to form areas of resist and areas where the board is etched. Plating the slots not only makes the slots conductive, the plating can reduce the roughness of the slot edges which can lower the friction of drawing the tape through the slots.

Figure 1:
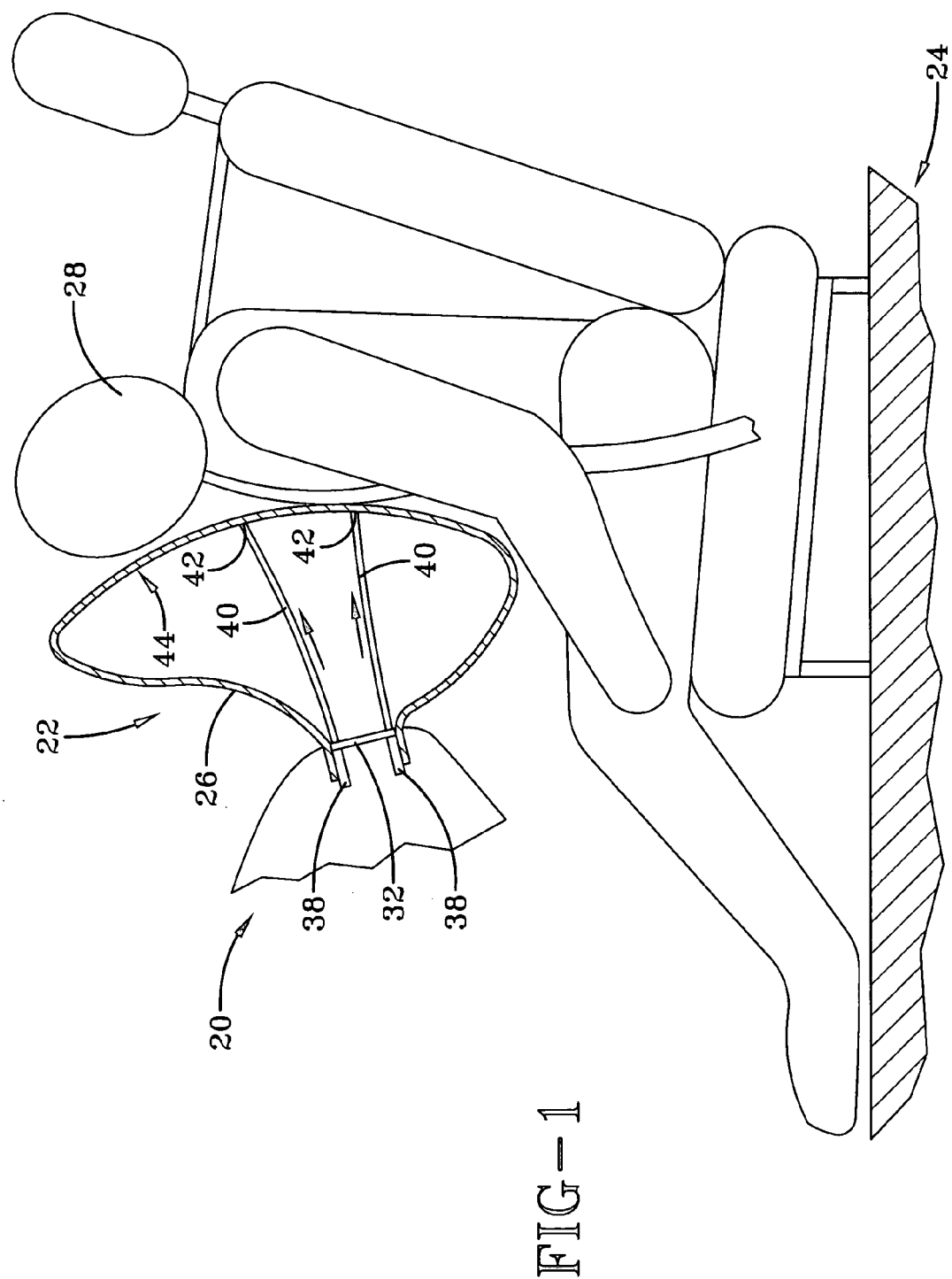
FIG. 1 is a schematic view, not to scale, showing an airbag deployment rate sensor of this invention within an airbag in relation to a vehicle occupant.

As shown in the FIG. 1, an airbag deployment rate sensor assembly 20 is part of an airbag assembly 22 which is mounted within a vehicle 24. The airbag assembly 22 can be mounted to a steering wheel or instrument panel of a vehicle or in another position within the vehicle. Airbags may be positioned in doors, seats, and other locations within a vehicle. The monitoring of airbag deployment is particularly advantageous for airbags placed directly in front of the vehicle occupants where the vehicle occupant may be too close to the deploying airbag. The airbag assembly 22 is shown deploying an inflatable airbag 26 into the path of a vehicle occupant 28 during a crash event.

Figure 2:
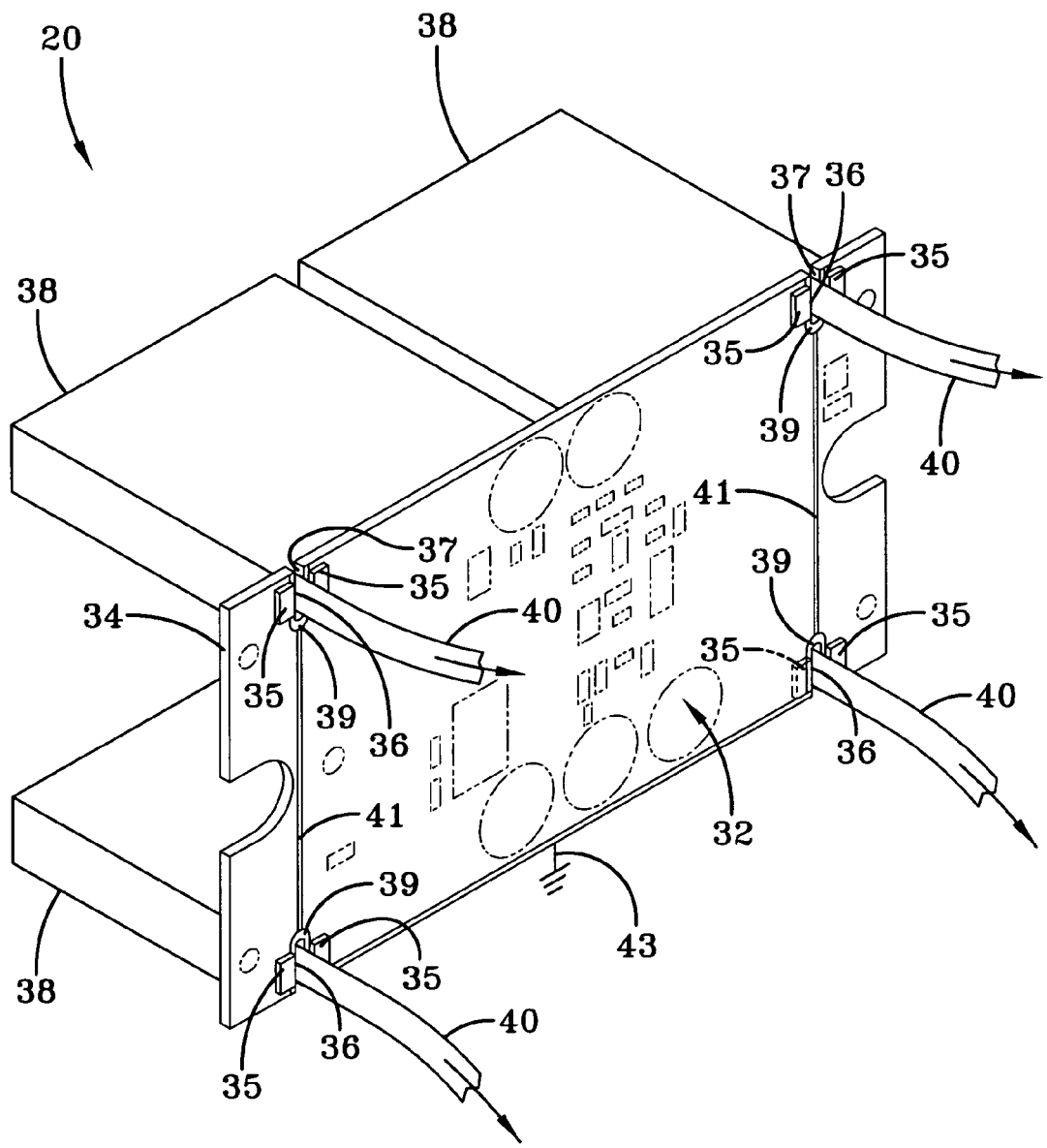
FIG. 2 is a fragmentary view of the apparatus of FIG. 1, showing tapes being extracted through the slots in the circuit board substrate.

The airbag assembly 22 includes an inflator that rapidly discharges a quantity of pressurized gas into the interior of the airbag 26 when instructed to do so by a control unit. The control unit typically is separate from the airbag assembly and controls a number of airbags or other safety systems. As shown in the figure, a printed circuit board 32 is constructed of a stiff electrically insulating substrate 34 for example fiber glass 0.031–0.125 inches thick, on which conductive traces are formed and electrical components are mounted. As shown in FIG. 2, the substrate 34 forms a structural part of an airbag deployment sensor assembly 20 on which tape deployment sensors 35 are mounted. As shown, the circuit board substrate 34 has four inwardly extending slots 36 formed in two opposed edges of the substrate 34. Each slot 36 is perpendicular to the edge of the substrate, and extends inwardly about 7.5 mm. The slots have through board extending edges 37 that are plated with about 0.001 inch of copper. A land 39 about the same width as the board thickness surrounds the slot 36. Copper traces 41 extend from each slot to a board ground 43. It is understood that the slots do not have to be adjacent to edges of the printed circuit board.

At least one tape cartridge 38 is mounted to the substrate 34. A cartridge 36 is adjacent each slot 36, and each cartridge holds a length of tape 40. The tape is made of cloth or of a similar material of organic or inorganic material. An outside end 42 of the length of tape 40 is fixed to the interior 44 of the airbag, while the remainder of the tape is retained within the cartridge. The tape may be coiled on a spool, or preferably is retained in a fanfold arrangement within the cartridge 38 to facilitate rapid deployment with minimal build-up of momentum. When a crash event is detected that calls for deployment of the airbag 26, an ignitor or other activating device is actuated, causing pressurized gas to fill the interior of the airbag, thereby rapidly inflating it. As the airbag inflates, the tapes 40 are drawn from the cartridges. The speed at which the tapes are withdrawn through the slots is measured by sensors 35 which respond to attributes of the tape, such as optical magnetic or electrical markings that pass by the sensors.

To prevent any static electrical charges on the lengths of tape from interfering with the electronics of the assembly 22, it is important to prevent uncontrolled static discharge. To this end, the substrate 34 and more particularly the edges 37 and the lands 39 around each of the slots 36 on the top and bottom of the board are formed by an electrically conductive coating. Copper traces 41 leading to a ground 43 and the lands 39 are formed as part of the etching of traces for mounting and connecting other electrical components on the board. Plating of the edges 37 is applied simultaneously with the formation of plating of the holes through the board. Thus conductive coating around the slots 36 and the traces 41 which lead to ground are created without adding any additional process steps. The plating also serves to provide a smooth surface to the edges 37 of the slots 36, which facilitates the unimpeded paying out of the tapes 40.

The conductive lands on the top and the bottom of the board are connected by the edge plating, and are further connected by the conductive lead 41 to the board ground 43. The lead 41 thus provides electrical connection between the electrically conductive coating overlying the guide slot surfaces and ground. Static charges on the tapes 40 are discharged by rubbing lightly past the conductive and grounded edges 37 of the slots 36, and any charge buildup which might impede operation of the airbag deployment sensor assembly 20 is avoided.

The static dissipating approach of this invention offers the advantage of having substantially no additional production cost, as the actual amount of coating material is extremely small, and the application of the coating is preferably carried out in steps which are required to be applied to the circuit board 32 in any event.

It should be noted that the term "tape" as used herein includes flat strip-like elongated members, as well as more uniform cylindrical members such as a string. It should also be understood that the printed circuit board 32 will preferably be the same board on which the electronics necessary to monitor the airbag deployment by means of the tapes 40 are mounted. Other circuits to control the venting of the airbag and even the airbag deployment and activation circuits might be mounted on the same board.

It should be understood that any conventional circuit board material including fiberglass, and various other ceramic or composite board structures may be used to form the slots 36 through which the tape 40 is drawn and which are plated or otherwise rendered conductive to prevent a buildup static charge due to the rapid movement of the tape during airbag activation.

It is understood that the invention is not limited to the particular construction and arrangement of parts herein illustrated and described, but embraces all such modified forms thereof as come within the scope of the following claims.

We claim:

1. An airbag deployment rate sensor assembly comprising:
    a substrate having portions defining a guide slot therein, the guide slot having conducting portions connected to a ground;
    a tape cartridge mounted with respect to the substrate; and
    a length of tape extending from the tape cartridge through the guide slot closely spaced from the conducting portions, such that the tape passing through the guide slot dissipates static charges on the length of tape.

2. The airbag deployment rate sensor of claim 1 wherein the substrate is a printed circuit board and wherein the conducting portions are copper plating of edges defined by the guide slot.

3. The airbag deployment rate sensor of claim 2 further comprising at least one copper trace extending from the copper plating of the edges defined by the guide slot to the ground.

4. The airbag deployment rate sensor of claim 1 wherein tape dispensing rate sensors are mounted to the substrate closely spaced from the guide slot to measure an attribute of the tape as it is drawn through the guide slot.

5. The airbag deployment rate sensor of claim 1 wherein the tape cartridge is mounted to a first side of the substrate, and the length of tape extends from the first side through the guide slot to a second side of the substrate.

6. An airbag assembly, comprising:
    an airbag;
    a deployment rate sensor system including a substrate incorporating a tape guide, portions of the tape guide being conductive, and electrically connected to a ground;
    a tape cartridge mounted with respect to the substrate; and
    a length of tape extending from the tape cartridge through the tape guide closely spaced from the portions of the tape guide which are conductive, such that the tape passing through the tape guide dissipates static charge on the length of tape.

7. The airbag assembly of claim 6 wherein the substrate is a printed circuit board, and the tape guide is formed by portions of the printed circuit board defining a slot, and the portions of the board defining the slot are plated with copper to define the portions of the tape guide which are conductive.

8. An airbag assembly, comprising:
   an airbag; and
   a deployment rate sensor system having a substrate having portions defining a guide slot therein, the guide slot having surfaces, and a tape cartridge is mounted with respect to the substrate, wherein a length of tape extends from the tape cartridge through the guide slot, the tape being fastened to a portion of the airbag, wherein an electrically conductive coating is positioned on the substrate to overlie the surfaces of the guide slot, such that when the airbag inflates, and the tape is withdrawn from the cartridge, the tape passing through the guide slot dissipates static charges accumulated along the length of tape.

9. A method of dissipating static electricity on a tape, comprising the steps of:

deploying an airbag; drawing a tape from a tape cartridge through portions of a circuit board defining a slot, the circuit board having a first side and a second side;

removing static charges from the tape as it is drawn through the circuit board slot by draining charge to ground from portions of the circuit board which are rendered conductive by a conductive coating formed on the printed circuit board; wherein the steps of forming the conductive coating on the circuit board comprise:

forming a copper trace on the first side of the circuit board surrounding at least a portion of the slot by selectively etching a copper coating on the first side, forming a copper trace on the second side of the circuit board surrounding at least a portion of the slot by selectively etching a copper coating on the second side, plating copper on at least one edge of the circuit board which extends from the first side to the second side, the edge extending between the copper trace on the first side and the copper trace on the second side.

\* \* \* \* \*